(12) United States Patent
Hotelling et al.

(10) Patent No.: US 10,474,287 B2
(45) Date of Patent: **\*Nov. 12, 2019**

(54) DOUBLE-SIDED TOUCH-SENSITIVE PANEL WITH SHIELD AND DRIVE COMBINED LAYER

(71) Applicant: Apple Inc., Cupertino, CA (US)

(72) Inventors: Steven P. Hotelling, Los Gatos, CA (US); Brian Richards Land, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,375

(22) Filed: Dec. 4, 2017

(65) Prior Publication Data

US 2018/0101275 A1  Apr. 12, 2018

Related U.S. Application Data

(63) Continuation of application No. 15/268,421, filed on Sep. 16, 2016, now Pat. No. 9,836,160, which is a
(Continued)

(51) Int. Cl.
*G09G 5/00* (2006.01)
*G06F 3/041* (2006.01)
(Continued)

(52) U.S. Cl.
CPC ........ *G06F 3/0416* (2013.01); *G02F 1/13338* (2013.01); *G06F 1/1692* (2013.01);
(Continued)

(58) Field of Classification Search
CPC .................. G06F 3/0416; G06F 3/0412; G06F 2203/04103; G06F 2203/04104;
(Continued)

(56) References Cited

U.S. PATENT DOCUMENTS 4,526,043 A   7/1985  Boie
4,571,454 A   2/1986  Tamaru et al.
(Continued)

FOREIGN PATENT DOCUMENTS

CN   1202254 A   12/1998
CN   1754141 A   3/2006
(Continued)

OTHER PUBLICATIONS

Boie, R.A. (Mar. 1984). "Capacitive Impedance Readout Tactile Image Sensor," *Proceedings of 1984 IEEE International Conference on Robotics and Automation*, pp. 370-378.
(Continued)

*Primary Examiner* — Jennifer T Nguyen
(74) *Attorney, Agent, or Firm* — Kubota & Basol LLP

(57) ABSTRACT

A multi-touch capacitive touch sensor panel can be created using a substrate with column and row traces formed on either side of the substrate. To shield the column (sense) traces from the effects of capacitive coupling from a modulated Vcom layer in an adjacent liquid crystal display (LCD) or any source of capacitive coupling, the row traces can be widened to shield the column traces, and the row traces can be placed closer to the LCD. In particular, the rows can be widened so that there is spacing of about 30 microns between adjacent row traces. In this manner, the row traces can serve the dual functions of driving the touch sensor panel, and also the function of shielding the more sensitive column (sense) traces from the effects of capacitive coupling.

20 Claims, 7 Drawing Sheets

Related U.S. Application Data continuation of application No. 14/734,998, filed on Jun. 9, 2015, now Pat. No. 9,465,502, which is a continuation of application No. 14/340,262, filed on Jul. 24, 2014, now Pat. No. 9,075,491, which is a continuation of application No. 13/078,789, filed on Apr. 1, 2011, now Pat. No. 8,884,890, which is a continuation of application No. 11/650,182, filed on Jan. 3, 2007, now Pat. No. 7,920,129.

(51) Int. Cl.
*G06F 3/044* (2006.01)
*G06F 1/16* (2006.01)
*G06F 3/047* (2006.01)
*G02F 1/1333* (2006.01)

(52) U.S. Cl.
CPC ............. *G06F 3/044* (2013.01); *G06F 3/047* (2013.01); *G06F 3/0412* (2013.01); *G09G 5/003* (2013.01); *G02F 2001/133342* (2013.01); *G06F 2203/04103* (2013.01); *G06F 2203/04104* (2013.01); *G06F 2203/04107* (2013.01); *G09G 2300/04* (2013.01)

(58) Field of Classification Search
CPC . G06F 2203/04107; G06F 3/044–0448; G02F 1/13338; G02F 2001/133342
USPC ........................ 345/174; 178/18.06
See application file for complete search history.

(56) References Cited

U.S. PATENT DOCUMENTS

| | | | |
|---|---|---|---|
| 4,686,332 A | 8/1987 | Greanias et al. |
| 4,698,461 A | 10/1987 | Meadows et al. |
| 4,700,022 A | 10/1987 | Salvador et al. |
| 4,922,061 A | 5/1990 | Meadows et al. |
| 5,062,198 A | 11/1991 | Sun |
| 5,083,118 A | 1/1992 | Kazama |
| 5,113,041 A | 5/1992 | Blonder et al. |
| 5,305,017 A | 4/1994 | Gerpheide |
| 5,442,347 A | 8/1995 | Vranish |
| 5,483,261 A | 1/1996 | Yasutake |
| 5,488,204 A | 1/1996 | Mead et al. |
| 5,528,267 A | 6/1996 | Ise |
| 5,543,588 A | 8/1996 | Bisset et al. |
| 5,565,658 A | 10/1996 | Gerpheide et al. |
| 5,574,262 A | 11/1996 | Petty |
| 5,648,642 A | 7/1997 | Miller et al. |
| 5,650,597 A | 7/1997 | Redmayne |
| 5,825,352 A | 10/1998 | Bisset et al. |
| 5,835,079 A | 11/1998 | Shieh |
| 5,844,506 A | 12/1998 | Binstead |
| 5,847,690 A | 12/1998 | Boie et al. |
| 5,861,875 A | 1/1999 | Gerpheide |
| 5,869,791 A | 2/1999 | Young |
| 5,880,411 A | 3/1999 | Gillespie et al. |
| 5,889,236 A | 3/1999 | Gillespie et al. |
| 5,914,465 A | 6/1999 | Allen et al. |
| 5,920,309 A | 7/1999 | Bisset et al. |
| 5,942,733 A | 8/1999 | Allen et al. |
| 6,128,045 A | 10/2000 | Anai |
| 6,188,391 B1 | 2/2001 | Seely et al. |
| 6,232,937 B1 | 5/2001 | Jacobsen et al. |
| 6,236,386 B1 | 5/2001 | Watanabe |
| 6,239,788 B1 | 5/2001 | Nohno et al. |
| 6,297,811 B1 | 10/2001 | Kent |
| 6,310,610 B1 | 10/2001 | Beaton et al. |
| 6,323,846 B1 | 11/2001 | Westerman et al. |
| 6,417,627 B1 | 7/2002 | Derraa |
| 6,452,514 B1 | 9/2002 | Philipp |
| 6,492,979 B1 | 12/2002 | Kent et al. |
| 6,587,358 B1 | 7/2003 | Yasumura |
| 6,690,387 B2 | 2/2004 | Zimmerman et al. |
| 6,847,354 B2 | 1/2005 | Vranish |
| 6,888,536 B2 | 5/2005 | Westerman et al. |
| 6,891,531 B2 | 5/2005 | Lin |
| 6,943,705 B1 | 9/2005 | Bolender et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,098,897 B2 | 8/2006 | Vakil et al. |
| 7,129,935 B2 | 10/2006 | Mackey |
| 7,184,064 B2 | 2/2007 | Zimmerman et al. |
| 7,218,314 B2 | 5/2007 | Itoh |
| 7,236,161 B2 | 6/2007 | Geaghan et al. |
| 7,339,579 B2 | 3/2008 | Richter et al. |
| 7,356,575 B1 | 4/2008 | Shapiro |
| 7,362,313 B2 | 4/2008 | Geaghan et al. |
| 7,372,455 B2 | 5/2008 | Perski et al. |
| 7,382,139 B2 | 6/2008 | Mackey |
| 7,511,702 B2 | 3/2009 | Hotelling |
| 7,532,205 B2 | 5/2009 | Gillespie et al. |
| 7,567,240 B2 | 7/2009 | Peterson et al. |
| 7,570,064 B2 | 8/2009 | Roziere |
| 7,639,238 B2 | 12/2009 | Hauck |
| 7,663,607 B2 | 2/2010 | Hotelling et al. |
| 7,692,729 B2 | 4/2010 | Pak et al. |
| 7,808,255 B2 | 10/2010 | Hristov et al. |
| 7,812,827 B2 | 10/2010 | Hotelling et al. |
| 7,812,828 B2 | 10/2010 | Westerman et al. |
| 7,821,502 B2 | 10/2010 | Hristov |
| 7,825,885 B2 | 11/2010 | Sato et al. |
| 7,825,905 B2 | 11/2010 | Philipp |
| 7,898,122 B2 | 3/2011 | Andrieux et al. |
| 7,920,129 B2 * | 4/2011 | Hotelling ............. G06F 3/0416 178/18.01 |
| 7,932,898 B2 | 4/2011 | Philipp et al. |
| 7,948,477 B2 | 5/2011 | Hotelling |
| 8,149,002 B2 | 4/2012 | Ossart et al. |
| 8,159,213 B2 | 4/2012 | Roziere |
| 8,355,887 B1 | 1/2013 | Harding et al. |
| 8,479,122 B2 | 7/2013 | Hotelling et al. |
| 8,633,910 B2 | 1/2014 | Miyazawa et al. |
| 8,665,237 B2 | 3/2014 | Koshiyama et al. |
| 8,698,770 B2 | 4/2014 | Chen |
| 8,766,950 B1 | 7/2014 | Morein et al. |
| 8,770,033 B2 | 7/2014 | Roziere |
| 8,773,351 B2 | 7/2014 | Rekimoto |
| 8,829,926 B2 | 9/2014 | Zachut et al. |
| 8,884,890 B2 * | 11/2014 | Hotelling ............. G06F 3/0416 178/18.01 |
| 8,917,256 B2 | 12/2014 | Roziere |
| 8,923,014 B2 | 12/2014 | Kim et al. |
| 9,000,782 B2 | 4/2015 | Roziere |
| 9,035,903 B2 | 5/2015 | Binstead |
| 9,075,491 B2 * | 7/2015 | Hotelling ............. G06F 3/0416 |
| 9,104,283 B2 | 8/2015 | Roziere et al. |
| 9,151,791 B2 | 10/2015 | Roziere |
| 9,250,757 B2 | 2/2016 | Roziere |
| 9,442,330 B2 | 9/2016 | Huo |
| 9,465,502 B2 * | 10/2016 | Hotelling ............. G06F 3/0416 |
| 9,535,547 B2 | 1/2017 | Roziere |
| 9,640,991 B2 | 5/2017 | Blondin et al. |
| 9,836,160 B2 * | 12/2017 | Hotelling ............. G06F 3/0416 |
| 10,007,388 B2 | 6/2018 | Roziere |
| 2002/0000977 A1 | 1/2002 | Vranish |
| 2002/0015024 A1 | 2/2002 | Westerman et al. |
| 2003/0075427 A1 | 4/2003 | Caldwell |
| 2003/0231168 A1 | 12/2003 | Bell et al. |
| 2004/0135773 A1 | 7/2004 | Bang et al. |
| 2004/0243747 A1 | 12/2004 | Rekimoto |
| 2005/0219228 A1 | 10/2005 | Alameh et al. |
| 2005/0270273 A1 | 12/2005 | Marten |
| 2006/0022956 A1 | 2/2006 | Lengeling et al. |
| 2006/0084852 A1 | 4/2006 | Mason et al. |
| 2006/0092142 A1 | 5/2006 | Gillespie et al. |
| 2006/0097733 A1 | 5/2006 | Roziere |
| 2006/0161871 A1 | 7/2006 | Hotelling et al. |
| 2006/0187214 A1 | 8/2006 | Gillespie et al. |
| 2006/0197753 A1 | 9/2006 | Hotelling |
| 2006/0207806 A1 | 9/2006 | Philipp |

(56) References Cited

U.S. PATENT DOCUMENTS

| | | |
|---|---|---|
| 2006/0227114 A1 | 10/2006 | Geaghan et al. |
| 2006/0274055 A1 | 12/2006 | Reynolds et al. |
| 2007/0034423 A1 | 2/2007 | Rebeschi et al. |
| 2007/0062739 A1* | 3/2007 | Philipp .................. G06F 3/044 178/18.06 |
| 2007/0074913 A1* | 4/2007 | Geaghan ................ G06F 3/044 178/18.06 |
| 2007/0273560 A1 | 11/2007 | Hua et al. |
| 2008/0006454 A1 | 1/2008 | Hotelling |
| 2008/0012835 A1 | 1/2008 | Rimon et al. |
| 2008/0042985 A1 | 2/2008 | Katsuhito et al. |
| 2008/0062148 A1 | 3/2008 | Hotelling et al. |
| 2008/0088595 A1 | 4/2008 | Liu et al. |
| 2008/0100572 A1 | 5/2008 | Boillot |
| 2008/0143683 A1 | 6/2008 | Hotelling |
| 2008/0158167 A1 | 7/2008 | Hotelling et al. |
| 2008/0158183 A1 | 7/2008 | Hotelling et al. |
| 2008/0158198 A1 | 7/2008 | Elias |
| 2008/0174321 A1 | 7/2008 | Kang et al. |
| 2008/0180365 A1 | 7/2008 | Ozaki |
| 2008/0231603 A1 | 9/2008 | Parkinson et al. |
| 2008/0246496 A1 | 10/2008 | Hristov et al. |
| 2008/0284261 A1 | 11/2008 | Andrieux et al. |
| 2009/0009485 A1 | 1/2009 | Bytheway |
| 2009/0091546 A1 | 4/2009 | Joo et al. |
| 2009/0139778 A1 | 6/2009 | Butler et al. |
| 2009/0179868 A1 | 7/2009 | Ayres et al. |
| 2009/0212642 A1 | 8/2009 | Krah |
| 2009/0309851 A1 | 12/2009 | Bernstein |
| 2010/0004029 A1 | 1/2010 | Kim |
| 2010/0019779 A1 | 1/2010 | Kato et al. |
| 2010/0031174 A1 | 2/2010 | Kim |
| 2010/0052700 A1 | 3/2010 | Yano et al. |
| 2010/0090964 A1 | 4/2010 | Soo et al. |
| 2010/0097346 A1 | 4/2010 | Sleeman |
| 2010/0123667 A1 | 5/2010 | Kim et al. |
| 2010/0123681 A1 | 5/2010 | Wu et al. |
| 2010/0139991 A1 | 6/2010 | Philipp et al. |
| 2010/0149127 A1 | 6/2010 | Fisher et al. |
| 2010/0182018 A1 | 7/2010 | Hazelden |
| 2010/0201635 A1 | 8/2010 | Klinghult et al. |
| 2010/0201647 A1 | 8/2010 | Verweg |
| 2010/0321275 A1 | 12/2010 | Hinckley et al. |
| 2010/0328262 A1 | 12/2010 | Huang et al. |
| 2011/0001491 A1 | 1/2011 | Huang et al. |
| 2011/0007021 A1 | 1/2011 | Bernstein et al. |
| 2011/0007030 A1 | 1/2011 | Mo et al. |
| 2011/0061949 A1 | 3/2011 | Krah et al. |
| 2011/0080391 A1 | 4/2011 | Brown et al. |
| 2011/0169770 A1 | 7/2011 | Mishina et al. |
| 2011/0169783 A1 | 7/2011 | Wang et al. |
| 2011/0216018 A1 | 9/2011 | Kim et al. |
| 2011/0234491 A1 | 9/2011 | Nurmi |
| 2012/0006266 A1 | 1/2012 | Nomura |
| 2012/0044662 A1 | 2/2012 | Kim et al. |
| 2012/0113038 A1 | 5/2012 | Chen |
| 2012/0187965 A1 | 7/2012 | Roziere |
| 2012/0188200 A1 | 7/2012 | Roziere |
| 2012/0235949 A1* | 9/2012 | Ligtenberg ............ G06F 1/1616 345/174 |
| 2013/0033450 A1 | 2/2013 | Coulson et al. |
| 2013/0135247 A1 | 5/2013 | Na et al. |
| 2013/0307776 A1 | 11/2013 | Roziere |
| 2014/0070823 A1 | 3/2014 | Roziere |
| 2014/0132335 A1 | 5/2014 | Rauhala et al. |
| 2014/0132534 A1 | 5/2014 | Kim |
| 2014/0267165 A1 | 9/2014 | Roziere |
| 2015/0035792 A1 | 2/2015 | Roziere et al. |
| 2015/0068897 A1 | 3/2015 | Neel et al. |
| 2015/0193012 A1 | 7/2015 | Phan |
| 2015/0303561 A1 | 10/2015 | Yang et al. |
| 2016/0034102 A1 | 2/2016 | Roziere et al. |
| 2016/0041650 A1 | 2/2016 | Roziere |
| 2016/0170533 A1 | 6/2016 | Roziere |
| 2017/0003817 A1 | 1/2017 | Hotelling et al. |
| 2017/0220156 A1 | 8/2017 | Blondin |
| 2017/0315646 A1 | 11/2017 | Roziere |

FOREIGN PATENT DOCUMENTS

| | | |
|---|---|---|
| CN | 2012-18943 Y | 4/2009 |
| CN | 102375603 A | 3/2012 |
| DE | 11-2012004912 T5 | 8/2014 |
| EP | 2 144 146 A1 | 1/2010 |
| EP | 2 148 264 A2 | 1/2010 |
| EP | 2 224 277 A1 | 9/2010 |
| EP | 2 267 791 A2 | 10/2010 |
| EP | 2 392 994 A1 | 2/2011 |
| FR | 2 756 048 A1 | 5/1998 |
| FR | 2 896 595 A1 | 7/2007 |
| FR | 2 949 008 A1 | 2/2011 |
| FR | 3 004 551 A1 | 10/2014 |
| JP | 2000-163031 A | 6/2000 |
| JP | 2002-342033 A | 11/2002 |
| JP | 2004-526265 A | 8/2004 |
| JP | 2006-251927 A | 9/2006 |
| JP | 2008-117371 A | 5/2008 |
| JP | 2009-086240 A | 4/2009 |
| JP | 2009-157373 A | 7/2009 |
| JP | 2011-146915 A | 7/2011 |
| KR | 10-2008-0041278 A | 5/2008 |
| KR | 10-2011-0044670 A | 4/2011 |
| TW | 200504518 A | 2/2005 |
| TW | 200508580 A | 3/2005 |
| TW | 200534581 A | 10/2005 |
| WO | WO-00/44018 A1 | 7/2000 |
| WO | WO-2004/023067 A2 | 3/2004 |
| WO | WO-2004/023067 A3 | 3/2004 |
| WO | WO-2005/073834 A2 | 8/2005 |
| WO | WO-2005/114369 A2 | 12/2005 |
| WO | WO-2005/114369 A3 | 12/2005 |
| WO | WO-2006/126703 A2 | 11/2006 |
| WO | WO-2007/060324 A1 | 5/2007 |
| WO | WO-2007/146780 A2 | 12/2007 |
| WO | WO-2008/000964 A1 | 1/2008 |
| WO | WO-2008/030780 A1 | 3/2008 |
| WO | WO-2011/015795 A2 | 2/2011 |
| WO | WO-2011/015795 A3 | 2/2011 |
| WO | WO-2012/106215 A2 | 8/2012 |
| WO | WO-2012/177237 A1 | 12/2012 |
| WO | WO-2013/093327 A1 | 6/2013 |
| WO | WO-2016/066282 A1 | 5/2016 |

OTHER PUBLICATIONS

Chun, K. et al. (Jul. 1985). "A High-Performance Silicon Tactile Imager Based on a Capacitive Cell," *IEEE Transactions on Electron Devices* 32(7):1196-1201.

Determination of Re-Examination Order mailed Sep. 17, 2013, for U.S. Ex Parte ReExamination Control No. 90/012,934, filed Jul. 30, 2013 (Re-exam of U.S. Pat. No. 7,920,129), 26 pages.

Kamba, T. et al. (1996). "Using Small Screen Space More Efficiently," *Proceedings of the SIGCHI Conference on Human Factors in Computing Systems*, Apr. 13-18, 1996, pp. 383-390.

Krein, P. et al. (May/Jun. 1990). "The Electroquasistatics of the Capacitive Touch Panel," *IEEE Transactions on Industry Applications* 26(3):529-534.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Leeper, A.K. (May 21, 2002). "14.2: Integration of a Clear Capacitive Touch Screen with a 1/8-VGA FSTN-LCD to Form and LCD-Based TouchPad," *SID 02 Digest*, pp. 187-189.

Non-Final Office Action dated Dec. 22, 2009, for U.S. Appl. No. 11/650,182, filed Jan. 3, 2007, six pages.

Non-Final Office Action dated May 26, 2010, for U.S. Appl. No. 11/650,182, filed Jan. 3, 2007, six pages.

Non-Final Office Action dated Oct. 15, 2010, for U.S. Appl. No. 11/650,182, filed Jan. 3, 2007, seven pages.

(56) References Cited

OTHER PUBLICATIONS

Non-Final Office Action dated Dec. 20, 2012, for U.S. Appl. No. 13/078,789, filed Apr. 1, 2011, 10 pages.
Non-Final Office Action dated Jul. 25, 2013, for U.S. Appl. No. 13/078,789, filed Apr. 1, 2011, six pages.
Non-Final Office Action dated Jan. 14, 2014, for U.S. Ex Parte ReExamination Control No. 90/012,934, filed Jul. 30, 2013 (Re-exam of U.S. Pat. No. 7,920,129-36.00) 28 pages.
Non-Final Office Action dated Nov. 24, 2014, for U.S. Appl. No. 14/340,262, filed Jul. 24, 2014, ten pages.
Non-Final Office Action dated Dec. 17, 2015, for U.S. Appl. No. 14/734,998, filed Jun. 9, 2015, eleven pages.
Non-Final Office Action dated Dec. 14, 2016, for U.S. Appl. No. 15/268,421, filed Jun. Sep. 16, 2016, 13 pages.
Notice of Allowance dated Feb. 14, 2011, for U.S. Appl. No. 11/650,182, filed Jan. 3, 2007, four pages.
Notice of Allowance dated Mar. 4, 2014, for U.S. Appl. No. 13/078,789, filed Apr. 1, 2011, five pages.
Notice of Allowance dated Jul. 18, 2014, for U.S. Appl. No. 13/078,789, filed Apr. 1, 2011, five pages.
Notice of Allowance dated Mar. 20, 2015, for U.S. Appl. No. 14/340,262, filed Jul. 24, 2014, five pages.
Notice of Allowance dated Jun. 15, 2016, for U.S. Appl. No. 14/734,998, filed Jun. 9, 2015, five pages.
Notice of Allowance dated Aug. 7, 2017, for U.S. Appl. No. 15/268,421, filed Jun. Sep. 16, 2016, five pages.
Notice of Intent to Issue Ex Parte Reexamination Certificate mailed Jun. 6, 2014, for U.S. Ex Parte ReExamination Control No. 90/012,934, filed Jul. 30, 2013 (Re-exam of U.S. Pat. No. 7,920,129), 20 pages.
Notice of Prior and Concurrent Proceedings under 37 C.F.R. § 1.565(a) for U.S. Ex Parte Reexamination Control No. 90/012,934, filed Jul. 30, 2013 (Reexamination of U.S. Pat. No. 7,920,129), nine pages.
Quantum Research Group. (2006). "Design Winds," 25 pages.
Quantum Research Group. (2006). "Qmatrix Technology White Paper," four pages.
Request for Ex Parte Reexamination of U.S. Pat. No. 7,920,129, 114 pages.
Response to Non-Final Office Action dated Apr. 14, 2014, for U.S. Ex Parte Reexamination Control No. 90/012,934, filed Jul. 30, 2013 (Reexamination of U.S. Pat. No. 7,920,129), 72 pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Sarma, K. (2004). "Liquid Crystal Displays," Electrical Measurement, Chapter 32 in *Signal Processing and Displays*, CRC Press LLC. pp. 32.1-32.21.
Search Report from Taiwan dated Nov. 6, 2012, for TW Patent Application No. 097100214, filed Jan. 3, 2008, one page.
Search Report from Taiwan dated Oct. 27, 2015, for ROC (Taiwan) Patent Application No. 102111751, filed Jan. 3, 2008, one page.
Search Report from Taiwan dated Aug. 18, 2016, for ROC (Taiwan) Patent Application No. 104139997, with English Translation, two pages.
Suzuki, K. et al. (Aug. 1990). "A 1024-Element High-Performance Silicon Tactile Imager," *IEEE Transactions on Electron Devices* 37(8):1852-1860.
Synaptics. (2005). "Transparent Capacitive Position Sensing", located at http://www.synaptics.com/technology/tcps.cfm, last visited Sep. 16, 2011, two pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

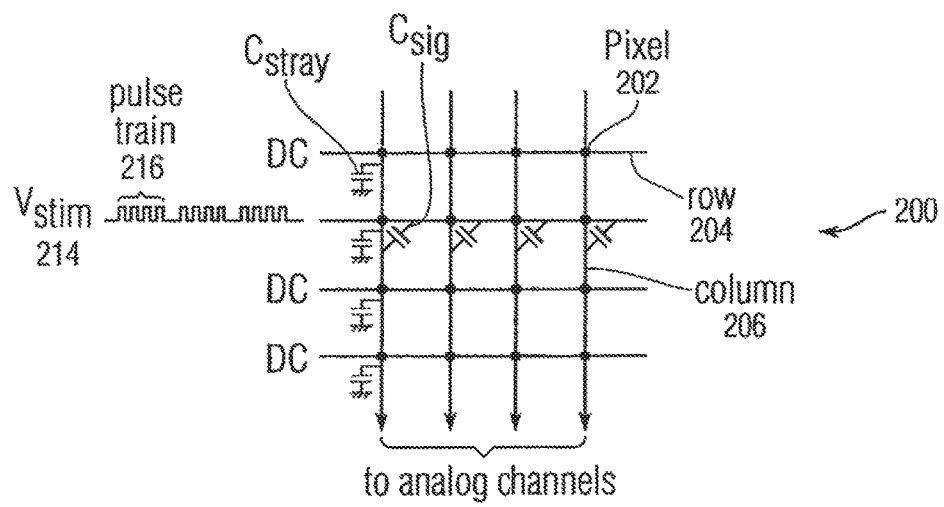
Fig. 2a
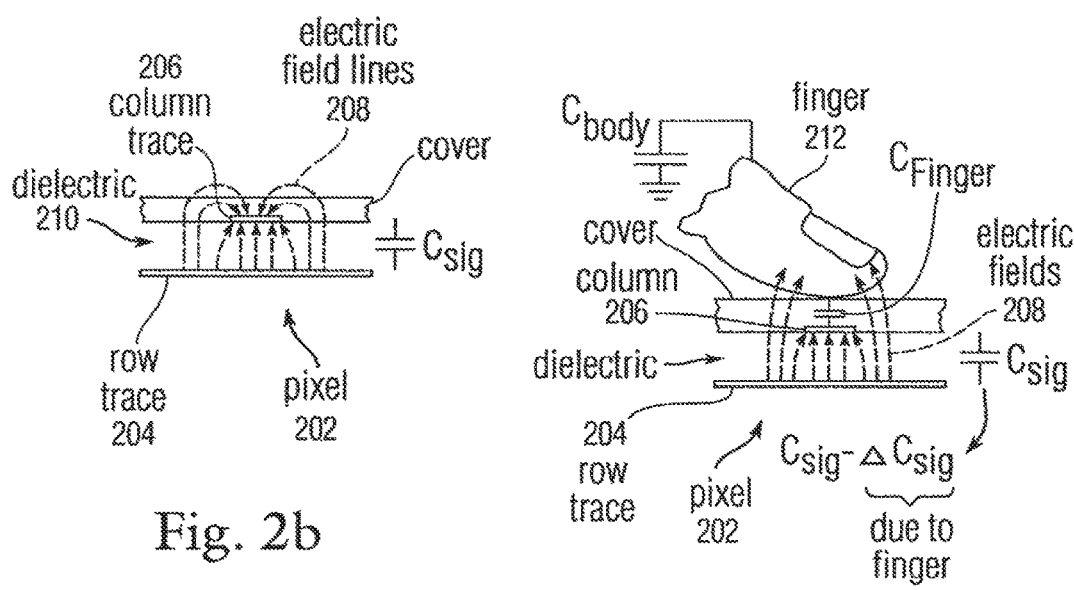
Fig. 2b
Fig. 2c

DOUBLE-SIDED TOUCH-SENSITIVE PANEL WITH SHIELD AND DRIVE COMBINED LAYER

CROSS-REFERENCE TO RELATED APPLICATIONS

This application is a continuation application of U.S. patent application Ser. No. 15/268,421, filed Sep. 16, 2016 (U.S. Patent Application Publication No. US 2017-0003817), which is a continuation application of U.S. patent application Ser. No. 14/734,998, filed Jun. 9, 2015 (now U.S. Pat. No. 9,465,502, issued Oct. 11, 2016), which is a continuation application of U.S. patent application Ser. No. 14/340,262, filed Jul. 24, 2014 (now U.S. Pat. No. 9,075,491, issued Jul. 7, 2015), which is a continuation application of U.S. patent application Ser. No. 13/078,789, filed Apr. 1, 2011 (now U.S. Pat. No. 8,884,890, issued Nov. 11, 2014) which is a continuation of U.S. patent application Ser. No. 11/650,182, filed Jan. 3, 2007 (now U.S. Pat. No. 7,920,129, issued Apr. 5, 2011; re-examination application Ser. No. 90/012,934, reexamination certificate issued Jul. 11, 2014) all of which are hereby incorporated by reference in their entirety for all purposes.

FIELD OF THE DISCLOSURE

This invention relates to touch sensor panels, and more particularly, to capacitive multi-touch sensor panels having rows and columns formed on either sides of the same substrate.

BACKGROUND OF THE DISCLOSURE

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Capacitive touch sensor panels can be formed from rows and columns of traces on opposite sides of a dielectric. At the "intersections" of the traces, where the traces pass above and below each other (but do not make direct electrical contact with each other), the traces essentially form two electrodes. Conventional touch panels for use over display devices have typically utilized a top layer of glass upon which transparent column traces of indium tin oxide (ITO) or antimony tin oxide (ATO) have been etched, and a bottom layer of glass upon which row traces of ITO have been etched. However, the use of transparent traces is not required if the conductors are thin enough (on the order of 30 microns). In addition, if panel transparency is not required (e.g. the touch panel is not being used over a display device), the conductors can be made out of an opaque material such as copper. The top and bottom glass layers are separated by a clear polymer spacer that acts as a dielectric between the row and column traces. The traces on both the top and bottom glass layers can have a spacing of about 5 mm.

To scan a sensor panel, a stimulus can be applied to one row with all other rows held at DC voltage levels. When a row is stimulated, a modulated output signal can be capacitively coupled onto the columns of the sensor panel. The columns can be connected to analog channels (also referred to herein as event detection and demodulation circuits). For every row that is stimulated, each analog channel connected to a column generates an output value representative of an amount of change in the modulated output signal due to a touch or hover event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch or hover can be obtained over the entire sensor panel. This image of touch or hover can include an analog channel output value for every pixel (row and column) in the panel, each output value representative of the amount of touch or hover that was detected at that particular location.

Because the rows must be either stimulated with an AC signal or held at a DC voltage level, and because the columns must be connected to analog channels so that modulated output signals can be detected, demodulated and converted to output values, electrical connections must be formed with the rows and columns on either side of the dielectric of the sensor panel. Because the rows and columns are perpendicular to each other, the most straightforward way to connect to these rows and columns is to bond a flex circuit at one edge of the sensor panel (e.g. the shorter side of a rectangular panel) to provide connections to the columns, and bond another flex circuit on an adjacent edge of the sensor panel (e.g. the longer side of a rectangular panel) to provide connections to the rows. However, because these flex circuit connections areas are not on the same edge of the sensor panel and are not on directly opposing sides of the dielectric, the sensor panel must be made larger to accommodate these two non-overlapping connection areas.

Furthermore, when a transparent capacitive touch sensor panel is bonded to a liquid crystal display (LCD), a modulated Vcom layer in the LCD can couple onto the columns of the sensor panel, causing noise to appear on the columns.

SUMMARY OF THE DISCLOSURE

A multi-touch sensor panel can be created using a substrate with column and row traces formed on either side of the substrate using a novel fabrication process. Flex circuits can be used to connect the column and row traces on either side of the sensor panel to its associated sensor panel circuitry. Traces made of copper or other highly conductive metals running along the edge of the substrate can be used to bring the row traces to the same edge of the substrate as the column traces so that the flex circuits can be bonded to the same edge of the substrate on directly opposing sides of the substrate, minimizing the area needed for connectivity and reducing the overall size of the sensor panel. A single flex circuit can be fabricated to connect to the rows and columns on directly opposing sides at the same edge of the substrate. Furthermore, the row traces can be widened to shield the column traces from a modulated Vcom layer.

Column and row ITO traces can be formed on both sides of a DITO substrate using several fabrication methods. In one embodiment, a substrate can be placed on the rollers of the fabrication machinery and a layer of ITO can be sputtered onto a first side of the DITO substrate and etched (e.g. using photolithography techniques) to form the column traces. A protective coating of photoresist (e.g. two layers of photoresist) can then be applied over the column traces, and the DITO substrate can be flipped over so that the rollers make contact only with the applied photoresist on the first side and not the formed column traces. Another layer of ITO can then be sputtered onto the now-exposed back side of the DITO substrate and etched to form row traces 508.

If no metal traces are required, the photoresist on the first side can be stripped off to complete the process. However, if metal traces are required at the edges to connect to the row traces and bring them to a particular edge of the substrate, a protective coating of photoresist (e.g. two layers of photoresist) can be applied over the row traces, leaving the edges exposed. A metal layer can then be sputtered over the photoresist and exposed edges, and the metal layer can then be etched to form metal traces at the edges. Finally, all remaining layers of photoresist can be stripped off.

Flex circuit portions on a single flex circuit can be formed for connecting to the row and column traces, respectively, on either side of a DITO substrate, and to a host processor. The flex circuit can also include a circuit area upon which a multi-touch subsystem, multi-touch panel processor, high voltage driver and decoder circuitry, an EEPROM and some essential small components such as bypass capacitors can be mounted and connected to save space.

The rows of the DITO substrate can also be widened for shielding purposes and for providing a uniform appearance according to embodiments of this invention. To prevent the capacitive coupling of a modulated Vcom layer onto the columns of the substrate, the rows may be widened. The number of rows does not change, but they can be much wider, leaving only about 30 microns of space between them. Because these wider rows are not isolated but are instead either held at a DC voltage or stimulated with a stimulation voltage, these wider rows act as a shield, preventing a modulated Vcom layer from capacitively coupling onto the columns. In addition, because of the narrow spacing between them, the wide rows provide a uniform appearance. Thus, shielding, modulation and a uniform appearance can be obtained from a single layer of ITO.

BRIEF DESCRIPTION OF THE DRAWINGS

FIG. 2a illustrates an exemplary capacitive multi-touch panel according to one embodiment of this invention.

FIG. 2b is a side view of exemplary pixel in a steady-state (no-touch) condition according to one embodiment of this invention.

FIG. 2c is a side view of exemplary pixel in a dynamic (touch) condition according to one embodiment of this invention.

DETAILED DESCRIPTION

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
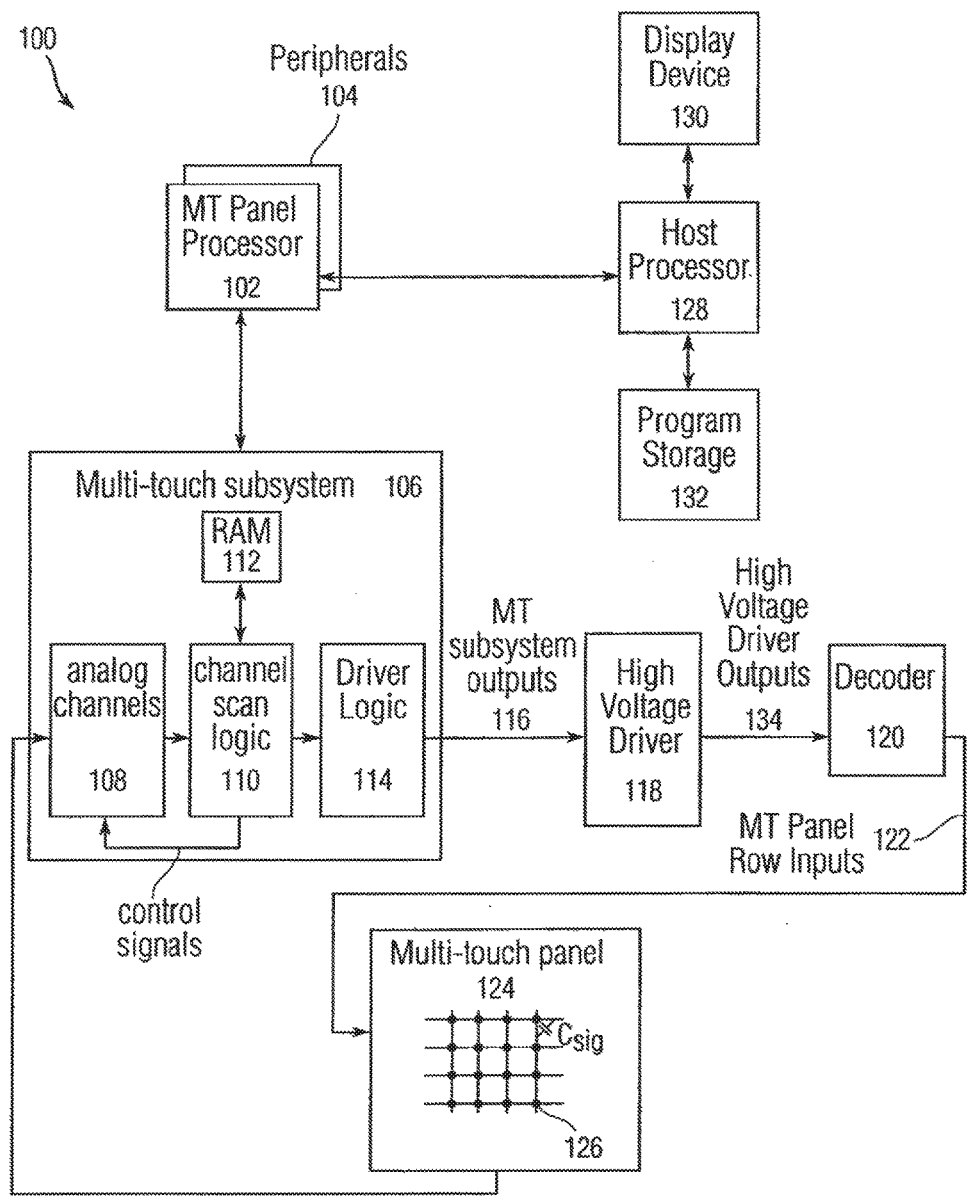
FIG. 1 illustrates an exemplary computing system operable with a capacitive multi-touch sensor panel according to one embodiment of this invention.

Multi-touch sensor panels and their associated sensor panel circuitry may be able to detect multiple touches (touch events or contact points) that occur at about the same time, and identify and track their locations. FIG. 1 illustrates exemplary computing system 100 operable with capacitive multi-touch sensor panel 124 according to embodiments of this invention. Multi-touch sensor panel 124 can be created using a substrate with column and row traces formed on either side of the substrate using a novel fabrication process. Flex circuits can be used to connect the column and row traces on either side of the sensor panel to its associated sensor panel circuitry. Traces made of copper or other highly conductive metals running along the edge of the substrate can be used to bring the row traces to the same edge of the substrate as the column traces so that the flex circuits can be bonded to the same edge of the substrate on directly opposing sides of the substrate, minimizing the area needed for connectivity and reducing the overall size of the sensor panel. A single flex circuit can be fabricated to connect to the rows and columns on directly opposing sides at the same edge of the substrate. Furthermore, the row traces can be widened to shield the column traces from a modulated Vcom layer.

Computing system 100 can include one or more panel processors 102 and peripherals 104, and panel subsystem 106. The one or more processors 102 can include, for example, an ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and panel 124. Each panel row input 122 can drive one or more rows in panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

As mentioned above, multi-touch panel 124 can in some embodiments include a capacitive sensing medium having a plurality of row traces or driving lines and a plurality of column traces or sensing lines (although other sensing media may also be used) separated by a dielectric. In some embodiments, the dielectric material can be transparent, such as glass, or can be formed from other materials such as Mylar. The row and column traces can be formed from a transparent conductive medium such as ITO or ATO, although other transparent or non-transparent materials such as copper can also be used. In some embodiments, the row and column traces can be perpendicular to each other, although in other embodiments other non-orthogonal and non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as may be used herein are intended to encompass not only orthogonal grids, but the intersecting traces of other geometric configurations having first and second dimensions (e.g. the concentric and radial lines of a polar-coordinate arrangement).

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 206 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can be generated as one or more pulse trains 216 at a particular frequency, with each pulse train including a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel can be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

As described above, because the rows may be either stimulated with an AC signal or held at a DC voltage level, and because the columns need to be connected to analog channels so that modulated output signals can be detected, demodulated and converted to output values, electrical connections must be formed with the rows and columns on either side of the dielectric of the sensor panel.

Figure 3:
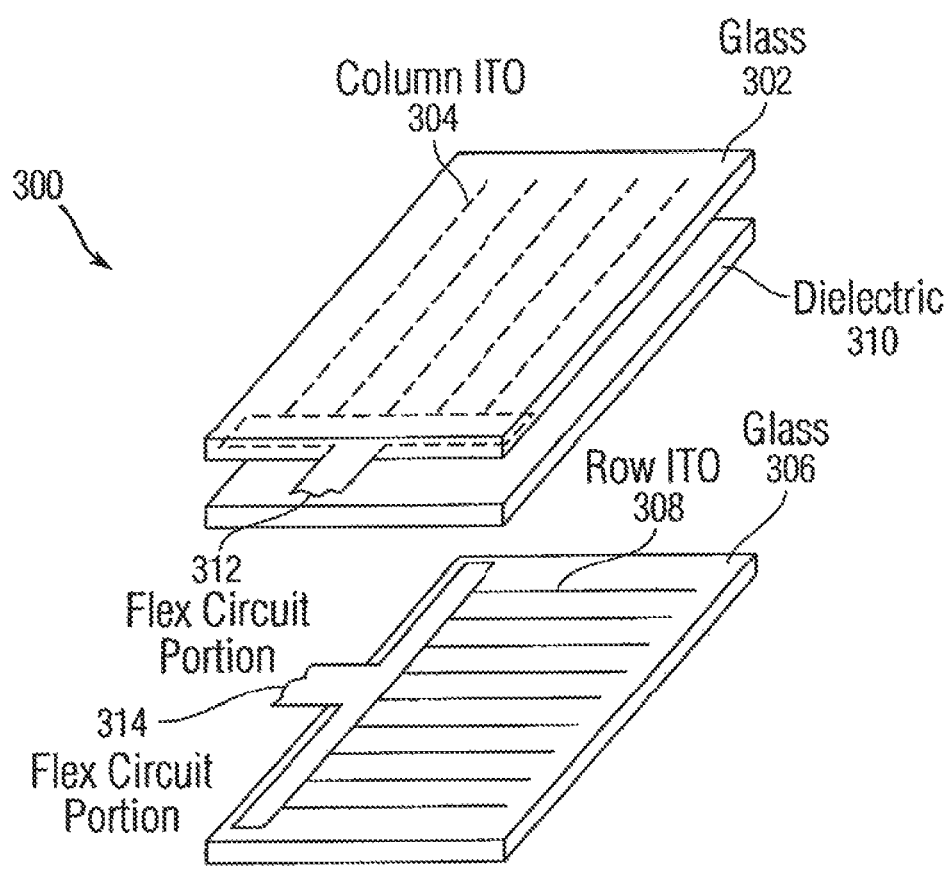
FIG. 3 is an exploded perspective view of an exemplary capacitive touch sensor panel formed from a top layer of glass upon which transparent column traces of ITO have been etched, and a bottom layer of glass upon which row traces of ITO have been etched.

FIG. 3 is an exploded perspective view of an exemplary capacitive touch sensor panel 300 formed from a top layer of glass 302 upon which transparent column traces of ITO 304 have been etched, and a bottom layer of glass 306 upon which row traces of ITO 308 have been etched. The top and bottom glass layers 302 and 306 are separated by a clear polymer spacer 310 that acts as a dielectric between the row and column traces. Because the rows and columns are perpendicular to each other, the most straightforward way to connect to these rows and columns is to bond flex circuit 312 at one edge of the sensor panel, and bond another flex circuit 314 on an adjacent edge of the sensor panel. However, because the connection areas for these flex circuits 312 and 314 are not on the same edge of sensor panel 300 and are not on directly opposing sides of dielectric 310, the sensor panel must be made larger to accommodate these two non-overlapping connection areas.

Capacitive touch sensor panels typically form the row and column traces on two pieces of glass as shown in FIG. 3 because it has not been practical to form column and row traces on either side of a single substrate. Conventional methods for forming ITO traces on one side of a substrate require that the substrate be placed on rollers during the fabrication process. However, if the substrate is then flipped over to form ITO traces on the second side, the rollers will damage any traces previously formed on the first side of the substrate. Furthermore, when etching is used to etch away part of the ITO to form traces on one side of the substrate, the entire substrate is conventionally placed in an etching bath, which will etch away any traces previously formed on the other side of the substrate.

Figure 4:
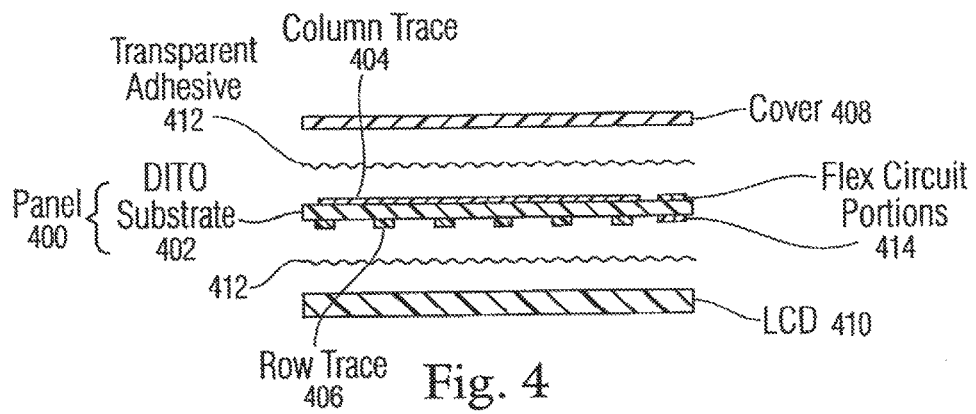
FIG. 4 illustrates an exemplary capacitive touch sensor panel fabricated using a double-sided ITO (DITO) substrate having column and row ITO traces formed on either side of the substrate, and bonded between a cover and an LCD using transparent adhesive according to one embodiment of this invention.

FIG. 4 illustrates an exemplary capacitive touch sensor panel 400 fabricated using a double-sided ITO (DITO) substrate 402 having column and row ITO traces 404 and 406, respectively, formed on either side of the substrate, and bonded between cover 408 and LCD 410 using transparent adhesive 412 according to embodiments of this invention. Substrate 402 can be formed from glass, plastic, hybrid glass/plastic materials, and the like. Cover 408 can be formed from glass, acrylic, sapphire, and the like. To connect to column and row traces 404 and 406, respectively, two flex circuit portions 414 can be bonded to directly opposing sides at the same edge of DITO 402, although other bonding locations may also be employed.

Figure 5:
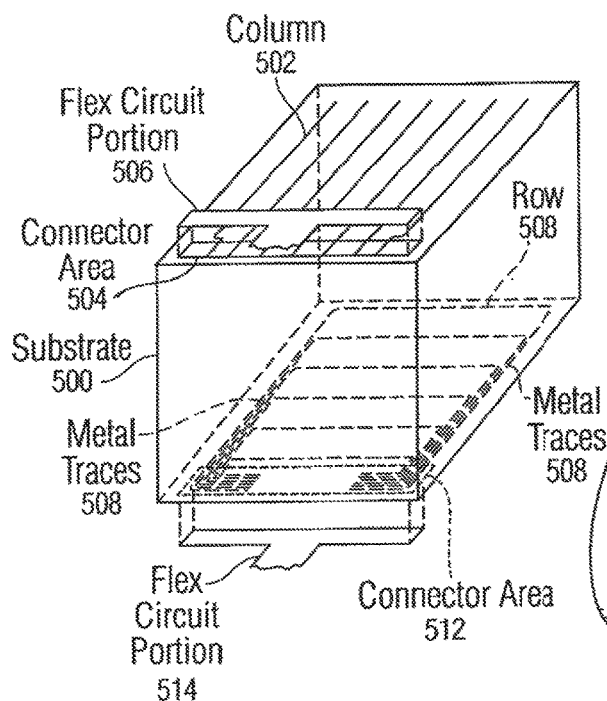
FIG. 5 is an exploded perspective view of an exemplary DITO substrate (with its thickness greatly exaggerated for purposes of illustration only) with columns and rows formed on either side according to one embodiment of this invention.

FIG. 5 is an exploded perspective view of an exemplary DITO substrate 500 (with its thickness greatly exaggerated for purposes of illustration only) with columns 502 and rows 508 formed on either side according to embodiments of this invention. Some of column ITO traces 502 on the top side are routed to a necked-down connector area 504, where they are brought off the panel by a flex circuit portion 506 that can be conductively bonded to the top of DITO substrate 500. In some embodiments, row ITO traces 508 on the bottom side can be connected to thin metal traces 510 that run alongside the edges of the bottom side. Metal traces 510 can be routed to connector area 512, which can be directly opposing connector area 504, or at least on the same edge of DITO substrate 500 as connector area 504. Providing connector areas 504 and 512 at the same edge of DITO substrate 500 can allow the substrate and therefore the product to be smaller. Another flex circuit portion 514 can be used to bring row ITO traces 508 off the panel.

Column and row ITO traces 502 and 508 can be formed on both sides of DITO substrate 500 using several fabrication methods. In one embodiment, a substrate can be placed on the rollers of the fabrication machinery and a layer of ITO can be sputtered onto a first side of DITO substrate 500 and etched (e.g. using photolithography techniques) to form column traces 502. A protective coating of photoresist (e.g. two layers of photoresist) can then be applied over the column traces 502, and DITO substrate 500 can be flipped over so that the rollers make contact only with the applied photoresist on the first side and not the formed column traces. Another layer of ITO can then be sputtered onto the now-exposed back side of DITO substrate 500 and etched to form row traces 508.

If no metal traces 510 are required, the photoresist on the first side can be stripped off to complete the process. However, if metal traces 510 are required at the edges to connect to row traces 508 and bring them to a particular edge of the substrate, a protective coating of photoresist (e.g. two layers of photoresist) can be applied over row traces 508, leaving the edges exposed. A metal layer can then be sputtered over the photoresist and exposed edges, and the metal layer can then be etched to form metal traces 510 at the edges. Finally, all remaining layers of photoresist can be stripped off.

Minor variations to the process described above can also be made. For example, the second side of the DITO substrate patterning may be formed by first patterning a photoresist using very simple geometry to cover only the interior region of the second side of the DITO substrate while leaving the edge regions exposed. For this variation, metal is sputtered first and then the photoresist with simple geometry is then stripped off to leave metal in the edge regions only. Then the ITO is sputtered over the entire second side of the DITO substrate. A second photoresist is applied and patterned to form the mask for the electrode patterns. A series of etching steps is then used to form the electrode pattern in the topmost ITO layer and metal layer underneath. The first etching steps etches the ITO only, and the second etch steps etches the metal layer only which produces the desired electrode geometry.

Figure 6:
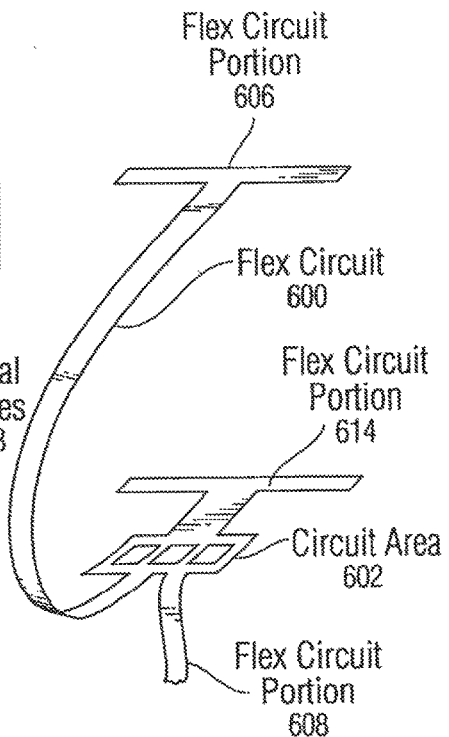
FIG. 6 illustrates an exemplary flex circuit according to one embodiment of this invention, including flex circuit portions for connecting to the row and column traces, respectively, on either side of a DITO substrate, and a flex circuit portion for connecting to a host processor.

FIG. 6 illustrates an exemplary flex circuit 600 according to embodiments of this invention, including flex circuit portions 606 and 614 for connecting to the row and column traces, respectively, on either side of a DITO substrate, and flex circuit portion 608 for connecting to a host processor. Flex circuit 600 includes a circuit area 602 upon which the multi-touch subsystem, multi-touch panel processor, the high voltage driver and decoder circuitry (see FIG. 1), an EEPROM and some essential small components such as bypass capacitors can be mounted and connected to save space. Circuit area 602 may be shielded by an EMI can (not shown) which encloses circuit area 602 using top and bottom shield portions. The bottom can may be adhered to a structure of the device to secure the circuit area. From this circuit area 602, flex circuit 600 may connect to the top of the DITO substrate via flex circuit portion 606, to the bottom of the DITO substrate via flex circuit portion 614, and to a host processor via flex circuit portion 608.

Figure 7:
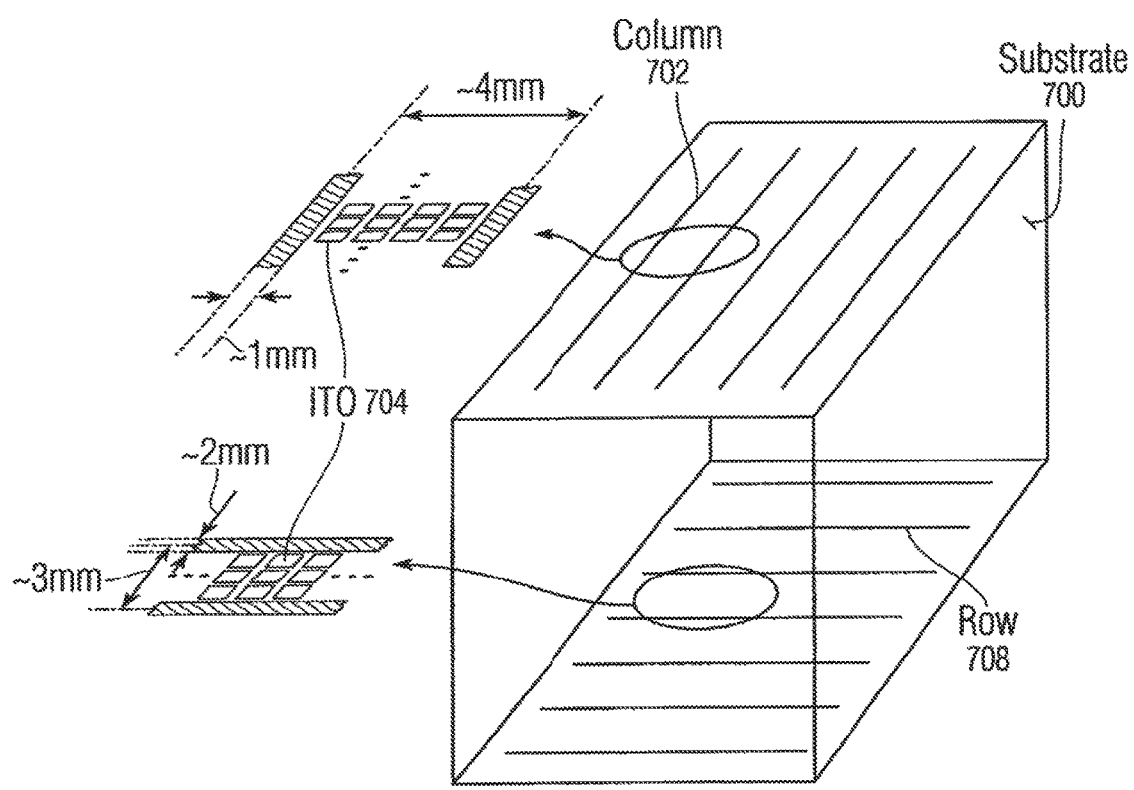
FIG. 7 is an exploded perspective view of an exemplary DITO substrate (with its thickness greatly exaggerated for purposes of illustration only) with columns and rows formed on either side, and small isolated squares between the columns and rows to provide a uniform appearance.

FIG. 7 is an exploded perspective view of an exemplary DITO substrate 700 (with its thickness greatly exaggerated for purposes of illustration only) with columns 702 and rows 708 formed on either side. As shown in FIG. 7, column traces 702 can be about 1 mm wide, with a spacing of about 4 mm between the traces, and row traces 708 can be about 2 mm wide, with a spacing of about 3 mm between the rows. To create a more uniform appearance, small isolated squares of ITO 704 can be formed between the column and row traces 702 and 708 on either side of DITO substrate 700, with narrow spacing (e.g. about 30 microns) between the isolated squares of ITO, so that either side of the DITO substrate provides a uniform appearance similar to a solid sheet of ITO.

Figure 8:
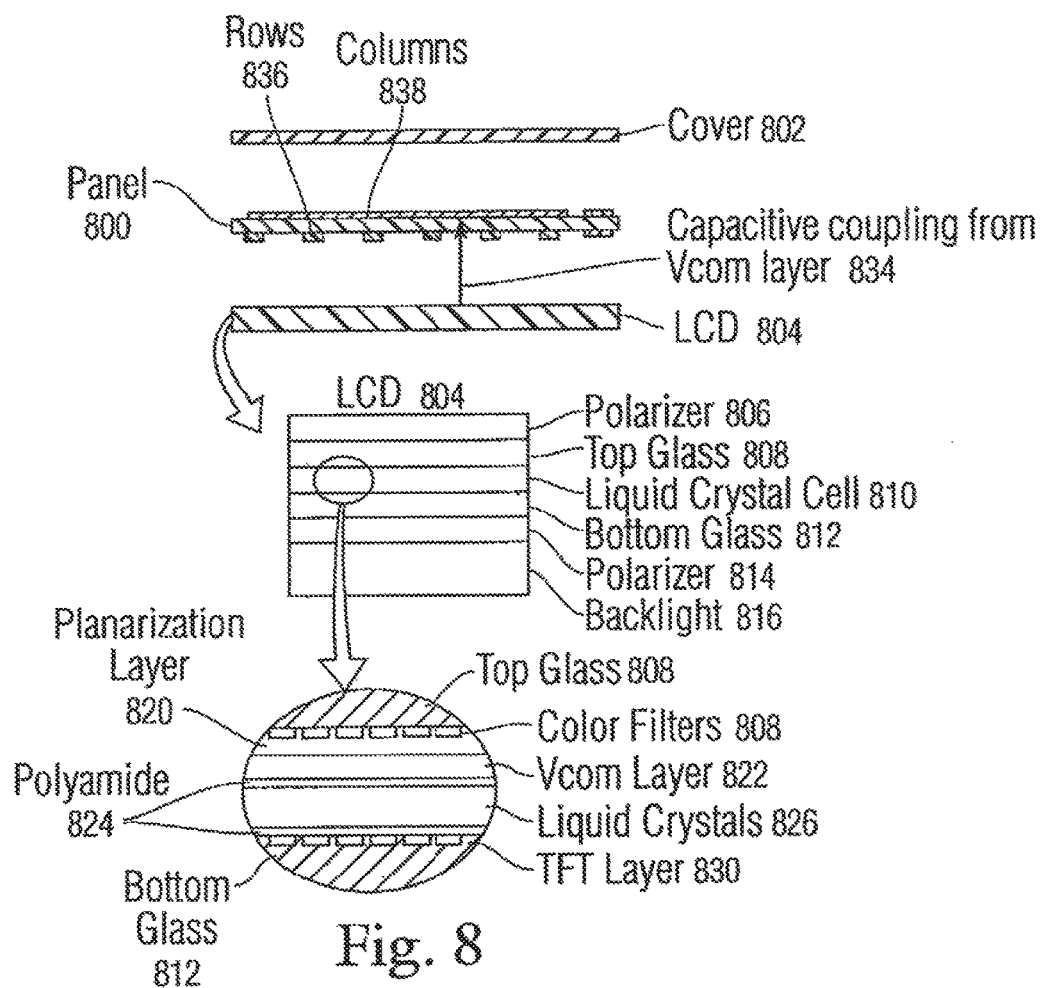
FIG. 8 illustrates a stackup of an exemplary double-sided touch panel along with a cover and liquid crystal display (LCD) according to one embodiment of this invention.

FIG. 8 illustrates a stackup of an exemplary double-sided touch panel 800 along with cover 802 and liquid crystal display (LCD) 804 according to embodiments of this invention. From top to bottom, LCD 804 can include polarizer 806, top glass layer 808, liquid crystal layer 810, bottom glass layer 812, polarizer 814, and backlight 816.

From top to bottom, liquid crystal layer 810 can include RGB color filter layer 818, planarization layer 820, a conductive unpatterned layer of ITO referred to as Vcom layer 822, polyamide layer 824, liquid crystal layer 826, and polyamide layer 828. Beneath polyamide layer 828 is a layer of ITO rectangles and TFTs (collectively referred to herein as TFT layer 830), with one ITO rectangle and TFT for each sub-pixel (where three sub-pixels comprise a pixel).

Color filter layer 818 provides the three RGB colors that make up each pixel when illuminated by light, wherein the ratio of colors determines the color of that pixel. Planarization layer 820 can be formed from clear plastic to smooth out the surface of color filter layer 818. Vcom stands for "Voltage common" because Vcom layer 822 provides a common voltage for the ITO subpixels of TFT layer 830. Vcom layer 822 may be maintained at a constant voltage (LCDs using a constant Vcom voltage may be referred to as DC or constant Vcom LCDs) or modulated with an AC signal. Polyamide layers 824 and 828 serve to pre-align the orientation of liquid crystals in liquid crystal layer 826. To create the color for one pixel, the ITO squares for each subpixel in TFT layer 830 can have voltages applied to them with respect to Vcom layer 822, which causes the liquid crystals to align and allow light from backlight 816 to pass through liquid crystal layer 826 and through the RGB color filters in color filter layer 818.

As mentioned above, although Vcom layer 822 can be held constant, in some embodiments the Vcom layer can be driven by a modulated signal (e.g. a squareware from about 1 to 4 volts). However, when Vcom layer 822 is driven by a modulated signal, the modulated signal may be capacitively coupled (see reference character 834) through the sparse conductors of rows 836 on the bottom of double-sided touch panel 800 and onto columns 838, causing noise on the columns. Note that rows 836 are referred to as "sparse," even though it includes many closely spaced ITO squares, because the squares are isolated and therefore of negligible effect from a shielding standpoint. Note also that although modulated Vcom layer 822 is also capacitively coupled onto rows 836, because the rows are being driven by driver circuitry with low impedance outputs, any capacitive coupling is shunted to the driver outputs, and has negligible effect. However, columns 838 are designed to sense small changes in the AC capacitance of the touch panel, so the capacitive coupling from modulated Vcom layer 822 can easily be seen as noise at the analog channels receiving the columns.

Figure 9:
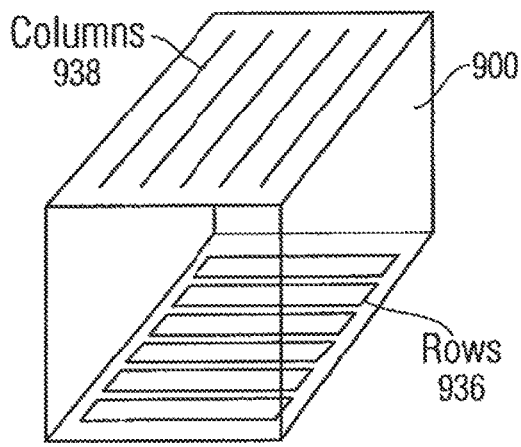
FIG. 9 is a perspective view of an exemplary DITO substrate (with its thickness greatly exaggerated for purposes of illustration only) illustrating the widening of rows for shielding purposes and for providing a uniform appearance according to one embodiment of this invention.

FIG. 9 is a perspective view of an exemplary DITO substrate 900 (with its thickness greatly exaggerated for purposes of illustration only) illustrating the widening of rows 936 for shielding purposes and for providing a uniform appearance according to embodiments of this invention. To prevent the capacitive coupling of a modulated Vcom layer onto columns 938, rows 936 may be widened as shown in FIG. 9. The number of rows 936 does not change, but they are now much wider (e.g. about 4.97 mm), leaving only about 30 microns of space between them. Because these wider rows 936 are not isolated but are instead either held at a DC voltage or stimulated with a stimulation voltage, these wider rows 936 act as a shield, preventing a modulated Vcom layer from capacitively coupling onto columns 938. In addition, because of the narrow spacing between them, rows 936 provide a uniform appearance. Thus, shielding, modulation and a uniform appearance can be obtained from a single layer of ITO. Note that although FIG. 9 illustrates rows and columns formed on opposite sides of a single substrate, wide rows can also be employed on the otherwise conventional touch sensor panel shown in FIG. 3. An alternative to these wide rows is to add another layer of ITO as a shield between the LCD and DITO, but this would represent extra cost, extra thickness, light loss, and unwanted color shift.

As mentioned above, top side of an exemplary DITO substrate according to embodiments of the invention may include isolated ITO squares between rows, and a bottom side may include wide rows. Outer row traces can be routed to a first flex connector area on the top side via traces. Rows on the bottom side can be routed to second flex connector areas via metal traces running along the long edges of the bottom side. Note that the second flex connector areas can be located on the same edge of the DITO substrate as the first flex connector, but the conductors themselves are located in non-overlapping areas to make bonding of flex circuits easier.

Figure 10A:
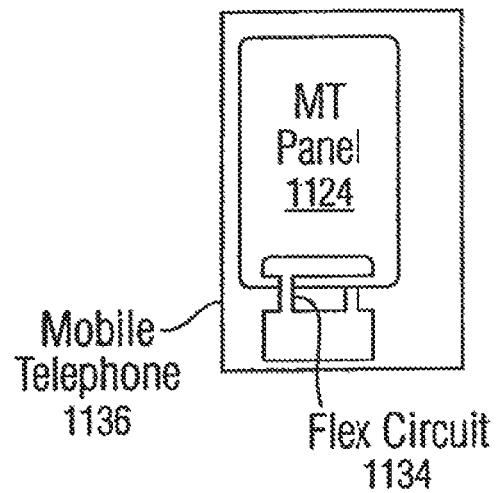
FIG. 10a illustrates an exemplary mobile telephone that can include the capacitive touch sensor panel and a flex circuit capable of connecting to both sides of the substrate according to one embodiment of this invention.
Figure 10B:
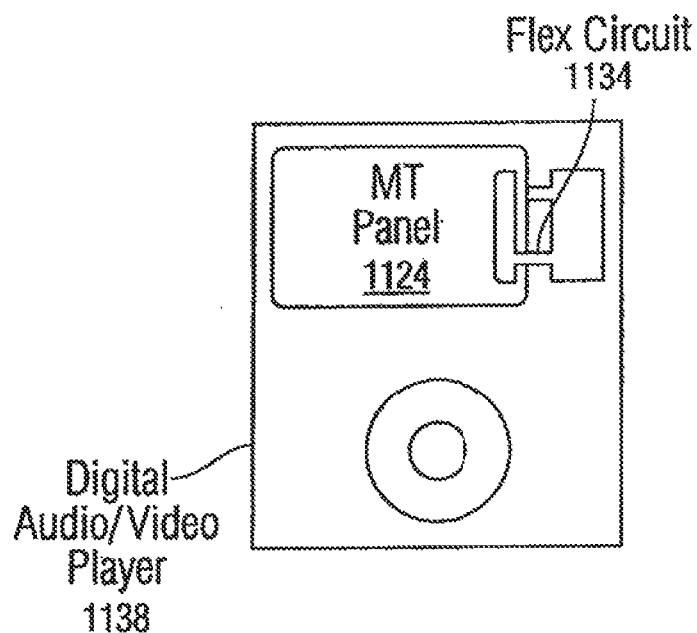
FIG. 10b illustrates an exemplary digital audio player that can include the capacitive touch sensor panel and a flex circuit capable of connecting to both sides of the substrate according to one embodiment of this invention.

FIG. 10a illustrates an exemplary mobile telephone 1136 that can include capacitive touch sensor panel 1124 and flex circuit 1134 capable of connecting to both sides of the substrate according to embodiments of this invention. Sensor panel 1124 can be fabricated using a substrate having column and row ITO traces formed on either side of the substrate, and metal traces form along the edges of one side of the substrate to allow flex circuit connection areas to be located on opposing sides of the same edge of the substrate. Furthermore, sensor panel 1124 can be fabricated with wide rows to provide modulated Vcom layer shielding as well as a uniform appearance. FIG. 10b illustrates an exemplary digital audio/video player 1138 that can include capacitive touch sensor panel 1124 and flex circuit 1134 capable of connecting to both sides of the substrate according to embodiments of this invention. Sensor panel 1124 can be fabricated using a substrate having column and row ITO traces formed on either side of the substrate, and metal traces form along the edges of one side of the substrate to allow flex circuit connection areas to be located on opposing sides of the same edge of the substrate. Furthermore, sensor panel 1124 can be fabricated with wide rows to provide modulated Vcom layer shielding as well as a uniform appearance. The mobile telephone and digital audio/video player of FIGS. 10a and 10b can advantageously benefit from sensor panel 1124 because a single, thinner, smaller-sized sensor panel can be used, and only a single layer of ITO is needed to provide shielding and a uniform appearance. The overall effect is reduced product size and manufacturing costs.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A sensor panel, comprising:
   a set of co-planar sense electrodes comprising a transparent conductive material and having a first width;
   a set of co-planar drive electrodes comprising the transparent conductive material and having a second width, wherein the set of co-planar drive electrodes are disposed on a different plane than the set of co-planar sense electrodes; and
   a dielectric disposed between the set of co-planar sense electrodes and the set of co-planar drive electrodes;
   wherein at least one of the set of co-planar drive electrodes is configured for receiving a first alternating current (AC) stimulation signal and configured for shielding the set of co-planar sense electrodes from electrical display interference;
   wherein a plurality of touch sensors are formed at a plurality of locations at which the set of co-planar sense electrodes intersect with the set of co-planar drive electrodes; and
   wherein the second width of the set of co-planar drive electrodes is wider than the first width of the set of co-planar sense electrodes.

2. The sensor panel of claim 1, wherein the set of co-planar drive electrodes is further configured to be switchably couplable for receiving a direct current (DC) voltage or the first AC stimulation signal.

3. The sensor panel of claim 1, wherein the set of co-planar sense electrodes and the set of co-planar drive electrodes are configured for providing optical uniformity.

4. The sensor panel of claim 1, the set of co-planar sense electrodes having a total surface area defining a first surface area and the set of co-planar drive electrodes having a total surface area defining a second surface area, wherein the second surface area is greater than the first surface area.

5. The sensor panel of claim 1, wherein the set of co-planar sense electrodes are arranged for capacitively coupling with one or more objects.

6. The sensor panel of claim 1, wherein the set of co-planar drive electrodes is configured for shielding the set of co-planar sense electrodes from a noise source.

7. The sensor panel of claim 1, wherein the set of co-planar drive electrodes is configured to provide shielding from capacitive coupling.

8. The sensor panel of claim 1, the sensor panel coupled to a panel subsystem controller configured for sending the first AC stimulation signal to the at least one of the set of co-planar drive electrodes and receiving sense signals from the set of co-planar sense electrodes.

9. The sensor panel of claim 1, the sensor panel incorporated into a touch or hover-sensitive computing system.

10. A sensor panel, comprising:
   a plurality of sense electrodes of conductive material having a first width; and
   a plurality of drive electrodes of the conductive material having a second width and spatially separated from the plurality of sense electrodes;
   wherein one or more of the plurality of drive electrodes are configured for receiving a first alternating current (AC) stimulation signal and configured for shielding the plurality of sense electrodes from electrical display interference;
   wherein a plurality of touch sensors are formed at a plurality of locations at which the plurality of sense electrodes cross over the plurality of drive electrodes; and
   wherein the second width of the plurality of drive electrodes is wider than the first width of the plurality of sense electrodes.

11. The sensor panel of claim 10, wherein the plurality of drive electrodes are further configured to be switchably couplable for receiving a direct current (DC) voltage or the first AC stimulation signal.

12. The sensor panel of claim 10, wherein the plurality of sense electrodes and the plurality of drive electrodes are formed from a transparent conductive material and configured for providing optical uniformity.

13. The sensor panel of claim 10, the plurality of sense electrodes having a total surface area defining a first surface area and the plurality of drive electrodes having a total surface area defining a second surface area, wherein the second surface area is greater than the first surface area.

14. The sensor panel of claim 10, wherein the plurality of sense electrodes are arranged for capacitively coupling with one or more objects.

15. The sensor panel of claim 10, wherein the plurality of drive electrodes are configured for shielding the plurality of sense electrodes from a noise source.

16. The sensor panel of claim 10, wherein the plurality of drive electrodes are configured to provide shielding from capacitive coupling.

17. The sensor panel of claim 10, the sensor panel coupled to a panel subsystem controller configured for sending the first AC stimulation signal to the one or more of the plurality of drive electrodes and receiving sense signals from the plurality of sense electrodes.

18. The sensor panel of claim 10, the sensor panel incorporated into a touch or hover-sensitive computing system.

19. A method for shielding a sensor panel, comprising:
   interposing a dielectric between a second layer of conductive material and a first layer of the conductive material, the first layer of conductive material including a plurality of sense electrodes and the second layer of conductive material including a plurality of drive electrodes;
   biasing one or more of the plurality of drive electrodes with a first alternating current (AC) stimulation signal to shield the plurality of sense electrodes from electrical display interference and to form a plurality of touch sensors at a plurality of locations at which the plurality of sense electrodes intersect with the plurality of drive electrodes; and
   forming the plurality of sense electrodes with a first width and forming the plurality of drive electrodes with a second width such that the second width is wider than the first width.

20. The method of claim 19, further comprising switchably biasing one or more of the plurality of drive electrodes to receive either a direct current (DC) voltage or the first AC stimulation signal.

* * * * *